March 27, 1934.  J. F. D'EWART  1,952,312
SEAL RING
Filed May 23, 1933
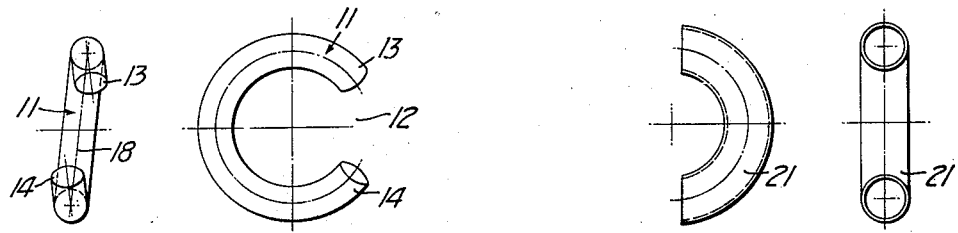
FIG.2.  FIG.1.  FIG.3.  FIG.4.
FIG.7.  FIG.5.
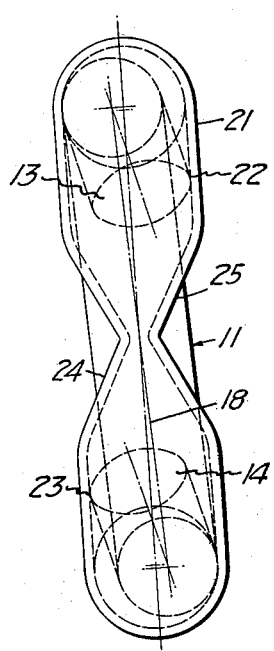
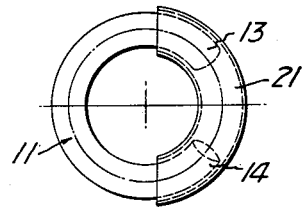
FIG.6.
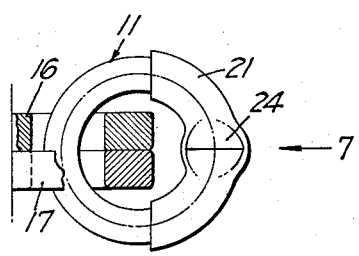
INVENTOR.
Jerome F. D'Ewart
BY
White, Prost, Fehr & Lothrop
ATTORNEYS.

Patented Mar. 27, 1934

1,952,312

UNITED STATES PATENT OFFICE 1,952,312

SEAL RING

Jerome F. D'Ewart, San Francisco, Calif.

Application May 23, 1933, Serial No. 672,376

5 Claims. (Cl. 292—307)

My invention relates to seal rings of the type shown in my Patent No. 1,792,575, issued February 17, 1931. Seal rings of the type referred to are particularly useful in place of padlocks, for instance in locking service cocks used by gas and water companies and for other instances in which a seal is desired to prevent or preclude tampering by unauthorized persons.

An object of my invention is to improve in general seal rings of the type mentioned.

Another object of my invention is to improve a seal ring of the type shown in my mentioned patent.

Another object of my invention is to provide a seal ring in which the process of manufacture is simplified.

A further object of my invention is to provide a seal ring in which the crimping operation is facilitated.

An additional object of my invention is to provide a seal ring in which the engagement of the closure tube and the ring is facilitated.

The foregoing and other objects are attained in the embodiment of the invention shown in the drawing, in which—

Figure 1 is a side elevation of a part of a seal ring in accordance with my invention.

Figure 2 is an end elevation of the mechanism shown in Figure 1.

Figure 3 is a side elevation of a closure tube in accordance with my invention.

Figure 4 is an end elevation of the closure tube shown in Figure 3.

Figure 5 is a side elevation of the seal ring of my invention with the component parts assembled.

Figure 6 is similar to Figure 5 but shows the parts after they have been crimped and as they are installed on a service cock.

Figure 7 is an elevation looking in the direction of the arrow 7 in Figure 6.

In its preferred form the seal ring of my invention includes an interrupted annular ring the termini of which are displaced with respect to each other out of the normal plane of the ring, thus providing a helical portion of the ring, together with which is utilized a closure tube adapted to be fitted over the helical portion of the ring and to jam on the ring when in assembled relationship therewith and to be crimped between the termini of the ring to prevent dislodgment of the parts. The word "helical" herein refers to the configuration of a helix, for instance an ordinary screw thread, or a tubular coil.

In the form of my invention shown in the drawing there is provided a ring 11 which preferably is of metal generally circular in cross-section and formed substantially as shown in Figure 1. The interrupted ring thus provided affords a space 12 between the termini 13 and 14 of the ring, to permit the introduction of the ring into the parts 16 and 17 of a service cock, for instance. The ring 11 is preferably of helical contour, as shown in Figure 2, or at least has one terminus 13 offset from the general plane 18 of the ring. Since the terminus or termini of the ring are in helical form or are offset, the manufacture of the ring is simplified inasmuch as a rod of the proper diameter can be wound upon a mandrel and then axially split into the component helical rings.

To co-operate with the ring 11, I provide a closure tube 21 which is preferably a metallic tube substantially semi-circular in compass and of sufficiently large internal diameter loosely to slip over the terminus 13 or the terminus 14 of the ring 11, and, further, which is constructed to such a size that its circumferential extent is greater than the length of the space or gap 12. Inasmuch as at least one of the termini of the ring is offset from the plane of the ring, the space or gap 12 may be made appreciably short in length and still allow for the slipping of the tube 21 over one of the termini of the ring, despite the fact that the tube usually is planar in symmetry. This is true even though the circumferential extent of the tube 21 is made considerably greater than the length of the gap 12.

In addition to the above advantages resulting from providing a ring having at least one termini offset from the plane of the ring, a stronger ring than a wholly planar ring is provided since the gap or space between the termini can be relatively small. Moreover, a stronger seal is provided since greater portions of the extremities of the ring 11 are encompassed by the tube 21 upon an assembly of the device.

Thus, in assembling the seal ring of my invention the locking tube 21 is slipped over one of the termini 13 a sufficient distance so that the other end of the tube can by reverse movement of the tube overlie and encompass the opposite terminus, say 14, of the ring. But such reverse movement is limited inasmuch as the configuration of the parts results in a jamming of one edge 22 of the terminus 13, for instance, against the interior wall of the tube 21, while one edge 23 of the opposite terminus 14 likewise jams against the opposite interior surface of the tube 21. Such jamming is effective to hold the parts in position without external aid, while the opposite walls of the tube are collapsed as at 24 and 25 to produce a crimp or displacement of the metal in order to prevent dislodgment of the parts with respect to each other.

I claim:

1. A seal ring comprising an interrupted ring the ends of which are axially offset with respect to each other, and a curved tube adapted to engage both of said offset ends and to be crimped therebetween.

2. A seal ring comprising a ring having two termini one of said termini being displaced from the general plane of said ring, and a tube adapted to engage both of said terminal and to be crimped therebetween.

3. A seal ring comprising an interrupted ring of generally helical configuration, and a tube of sufficiently large internal diameter to slip over said ring and to engage both termini thereof.

4. A seal ring comprising an interrupted ring having a gap of a predetermined size between the termini thereof, and an arcuate tube of greater extent than said gap and of different configuration than said ring adapted to slip over said ring and jam against said termini.

5. A seal ring comprising an interrupted ring having termini spaced apart circumferentially and axially, and a tube of arcuate contour adapted to span the space between said termini and jam against both of said termini.

JEROME F. D'EWART.